US007840948B2

(12) United States Patent
Chace

(10) Patent No.: US 7,840,948 B2
(45) Date of Patent: Nov. 23, 2010

(54) AUTOMATION OF KEYBOARD ACCESSIBILITY TESTING

(75) Inventor: Stephanie Chace, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/562,117

(22) Filed: Nov. 21, 2006

(65) Prior Publication Data

US 2008/0120603 A1  May 22, 2008

(51) Int. Cl.
*G06F 9/44* (2006.01)
(52) U.S. Cl. .................. 717/124; 717/125; 717/108; 717/109; 717/113
(58) Field of Classification Search .................. 717/124
See application file for complete search history.

(56) References Cited

U.S. PATENT DOCUMENTS

| | | | |
|---|---|---|---|
| 4,202,041 A | 5/1980 | Kaplow et al. | |
| 4,523,298 A | 6/1985 | Sakurai | |
| 4,823,311 A | 4/1989 | Hunter et al. | |
| 4,885,580 A | 12/1989 | Noto et al. | |
| 4,906,117 A | 3/1990 | Birdwell | |
| 5,034,598 A | 7/1991 | Poland | |
| 5,086,503 A | 2/1992 | Chung et al. | |
| 5,218,605 A * | 6/1993 | Low et al. | 714/45 |
| 5,475,843 A * | 12/1995 | Halviatti et al. | 717/124 |
| 5,576,734 A * | 11/1996 | Daniele et al. | 345/168 |
| 5,631,643 A | 5/1997 | Hisamori et al. | |
| 5,745,767 A * | 4/1998 | Rosen et al. | 717/124 |
| 5,781,720 A * | 7/1998 | Parker et al. | 714/38 |
| 5,847,697 A * | 12/1998 | Sugimoto | 345/168 |
| 5,880,685 A | 3/1999 | Weeks | |
| 5,920,308 A | 7/1999 | Kim | |
| 6,429,793 B1 * | 8/2002 | Paolini | 341/22 |
| 6,643,721 B1 | 11/2003 | Sun | |
| 2004/0015315 A1 * | 1/2004 | Kreider | 702/122 |
| 2004/0177344 A1 * | 9/2004 | Kuo | 717/125 |

OTHER PUBLICATIONS

E. Kuhar, "General Keyboard Translator Adapter". IBM Technical disclosure bulletin, vol. 20, No. 8. Jan. 1978. pp. 2935-2936.
"Pervasive user interface with smart devices, centralized computing and communication". Research Disclosure. p. 1610. Sep. 2001.

* cited by examiner

*Primary Examiner*—Thomas K Pham
(74) *Attorney, Agent, or Firm*—Cantor Colburn LLP; Steven Kurlowecz

(57) ABSTRACT

A computer program product and method for testing software applications for keyboard accessibility call for generating a first test script from a first input stream; identifying key signals associated with keys of a test keyboard; associating the key signals to the first input-stream to generate a second test script; and running the second test script to test the keyboard accessibility.

12 Claims, 3 Drawing Sheets

AUTOMATION OF KEYBOARD ACCESSIBILITY TESTING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to testing software for keyboard accessibility.

2. Description of the Related Art

Section 508 of the Rehabilitation Act Amendments of 1998 mandates that United States government agencies provide people with disabilities access to electronic and information technology. The electronic and information technology includes any product used to acquire, store, manipulate, or transmit information. Software applications are considered electronic and information technology. Similarly, computer input devices, such as keyboards, also fall under the umbrella of electronic and information technology.

Many people with disabilities have problems using a computer-pointing device such as a "mouse." These people need to be able to operate software using only a keyboard. Different types of keyboards are available to people with disabilities. For example, some keyboards have various curvatures and key configurations to enable people with wrist disabilities to enter keystrokes. Keyboard accessibility requires that computer functions be accessible using only keyboard strokes.

Companies that wish to sell electronic and information technology such as software to the government have to prove that the technology is keyboard accessible. Currently, the standard approach for testing for keyboard accessibility is through manual execution of the application. Specifically, multiple tests of the same software application function are run with alternate keyboards and "sticky key" mappings. The sticky key mappings are accessibility features that enable a person to only use one keystroke at a time when normally two or more are simultaneously required.

Many graphical user interface (GUI) testing applications (such as IBM's Rational Robot and XDE Tester) have record and playback functions. Keyboard entries and mouse clicks along with a resulting application response are recorded. From the recorded keyboard entries and mouse clicks, the testing applications generate program code referred to as "test scripts." The test scripts may be run to simulate the previously recorded keyboard entries and mouse clicks. The resulting application responses may be played back and compared to previously recorded application responses.

Testing of alternate keyboards using the GUI testing applications still requires a specific test script for each of the alternate keyboards. This results in a significant amount of duplication within the test scripts and creates a maintenance problem for the tester.

Many computer software developers will recognize that the great variety of software applications, operating systems, and input devices can pose challenges. One challenge is the malfunction of the software applications due to unforeseen input devices. Accordingly, testing during the development process is required.

What are needed are software and hardware that automate certain aspects of testing software for keyboard accessibility.

SUMMARY OF THE INVENTION

The shortcomings of the prior art are overcome and additional advantages are provided through the provision of a computer program product stored on machine readable media including machine readable instructions for testing software applications for keyboard accessibility, the instructions include instructions for generating a first test script from a first input stream; identifying key signals associated with keys of a test keyboard; associating the key signals to the first input-stream to generate a second test script; and running the second test script to test keyboard accessibility.

Also disclosed is a computer system including a computer program product having instructions for testing software applications for keyboard accessibility, the product includes instructions for generating a first test script from a first input stream; identifying key signals associated with the keys of a test keyboard via an operating system architecture; receiving information for the key signals; creating a library of information for the key signals; associating the key signals to the first input stream to generate a second test script; receiving user input to modify the second test script; receiving user input generating at least one of function keys and sticky keys; automatically modifying the second test script; automatically generating at least one of function keys and sticky keys; running the second test script; and comparing results from running the second test script to the results from running the first test script to test keyboard accessibility.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution in which a computer program product stored on machine readable media includes machine readable instructions for testing software for keyboard accessibility, the instructions include instructions for generating an initial test script from a first input stream; identifying key signals associated with keys of a test keyboard; associating the key signals to the first input-stream to generate a second test script; and running the second test script to test keyboard accessibility.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
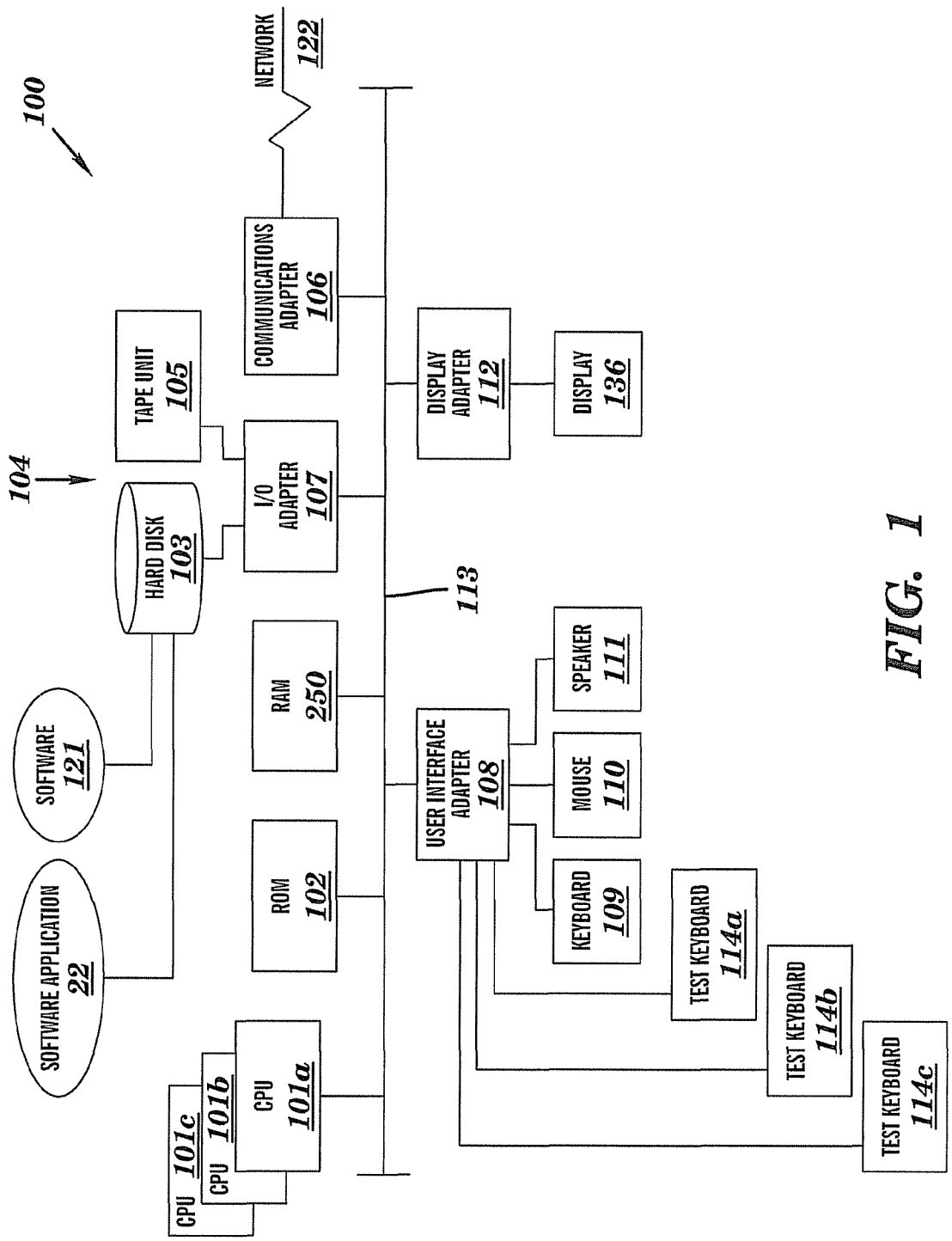
FIG. 1 depicts aspects of a computing infrastructure for implementation of the teachings herein.

The detailed description explains the preferred embodiments of the invention, together with advantages and features, by way of example with reference to the drawings.

DETAILED DESCRIPTION OF THE INVENTION

The teachings herein provide techniques for automating certain aspects of testing software applications for keyboard accessibility. In general, to provide for testing software applications for keyboard accessibility, a computer processing system is used. The computer processing system is configured with testing software. The testing software provides for the testing to ensure keyboard accessibility. Coupled to the computer processing system are various components. The computer processing system typically includes a keyboard and mouse for an operator. The computer processing system also includes a plurality of test components for testing. As discussed herein, the test components include a plurality of test keyboards.

Each of the test keyboards contains a set of keys. When each key is depressed, the depressing will generate a distinctive signal. The distinctive signal is referred to as a "key signal." The key signal communicates to the computer which key has been depressed. The testing software identifies the key signals associated with each of the keys for each test keyboard in the plurality of test keyboards.

Typically, the operator tests the software application by inputting at least one of a keystroke and mouse click. The computer processing system processes the input for use by the software application. The operator observes a response of the software application to verify a correct response. The testing software records inputs and responses and generates an initial test script. The initial test script may be played back to simulate the inputs. In general, the test script may be played in a shorter period of time than would be required if the keystrokes and mouse clicks were input manually.

The testing software associates the key signals from the keys of the test keyboard with the inputs used to generate the initial test script. The associating provides for generating an individual test script. The individual test script is used to simulate keystrokes from the test keyboard. Running the individual test script will test the software application for accessibility with the test keyboard. In general, the software application output resulting from running the initial test script is compared to the output resulting from running the individual test script. If the results are the same, then the software application is accessible to the test keyboard.

In one embodiment, the computer processing system may include infrastructure for only one keyboard. In this embodiment, keyboards are tested one at a time.

The term "keys" relates to the physical keys of the keyboard. The term "keystrokes" relates to physically depressing a respective key. The test scripts provide keystroke inputs to the software application without anyone having to actually depress any keys. The term "kernel mode" relates to running code in a privileged mode. The privileged mode provides access to memory and computer processing unit (CPU) instructions. In general, low-level code operates in the kernel mode. The term "user mode" relates to running code in a mode less privileged than the kernel mode. Typically, software applications run in the user mode. The term "NTDLL.DLL" relates to a function library. The function library provides for making code transitions from the kernel mode to the user mode. The term "environmental functions" relates to an interface between software applications and code running in the kernel mode. The term "Win32 API" relates to an application programming interface. The application programming interface provides functions at the request of the software applications. The term "function keys" relates to keys that can be programmed to perform certain actions. Although some of this terminology is with reference to a specific operating system, it should be understood that the teachings may be applied to a variety of operating systems or various platforms.

Referring now to FIG. 1, an embodiment of a computer processing system 100 for implementing the teachings herein is depicted. System 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 250 and various other components via a system bus 113. Read only memory (ROM) 102 is coupled to the system bus 113 and may include a basic input/output system (BIOS), which controls certain basic functions of system 100.

FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. The network adapter 106 interconnects bus 113 with a network 122 enabling data processing system 100 to communicate with other such systems. The network 122 can be a local-area network (LAN), a metro-area network (MAN), or wide-area network (WAN), such as the Internet or World Wide Web. Display monitor 136 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. An operator keyboard 109, mouse 110, and speaker 111 all interconnected to bus 113 via user interface adapter 108, which may include, for example, a Super I/O chip integrating multiple device adapters into a single integrated circuit. Test keyboards 114*a*, 114*b*, 114*c*, etc. (collectively or generically referred to as test keyboard(s) 114) are connected to the user interface adapter 108. Typically, the system 100 is controlled via the operator keyboard 109 and mouse 110.

As disclosed herein, the system 100 includes machine readable instructions stored on machine readable media (for example, the hard disk 103) for automating certain aspects of testing a software application 22 for accessibility to test keyboards 114. As disclosed herein, the instructions are referred to as "keyboard accessibility testing software 121." The keyboard accessibility testing software 121 may be produced using software development tools as are known in the art. The keyboard accessibility testing software 121 may be provided as an "add-in" to an application (where "add-in" is taken to mean supplemental program code as is known in the art). In such embodiments, the keyboard accessibility testing software 121 replaces or supplements structures of the application for testing software.

Thus, as configured FIG. 1, the system 100 includes processing means in the form of processors 101, storage means including system memory 250 and mass storage 104, input means such as the operator keyboard 109 and mouse 110, and output means including speaker 111 and display 136. In one embodiment a portion of system memory 250 and mass storage 104 collectively store an operating system such as the AIX® operating system from IBM Corporation to coordinate the functions of the various components shown in FIG. 1.

It will be appreciated that the system 100 can be any suitable computer, Windows-based terminal, wireless device, information appliance, RISC Power PC, X-device, workstation, mini-computer, mainframe computer, cell phone, personal digital assistant (PDA) or other computing device.

Examples of other operating systems supported by the system 100 include versions of Windows, Macintosh, Java, LINUX, and UNIX, or other suitable operating systems.

Users of the system 100 can connect to the network 122 through any suitable connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

The keyboard accessibility testing software 121 automates certain aspects of identifying the keys associated with the test keyboards 114. There are several techniques for identifying the keys. The techniques may be used individually or in combination. With one technique, the keyboard accessibility testing software 121 identifies the keys via an operating system architecture.

Figure 2:
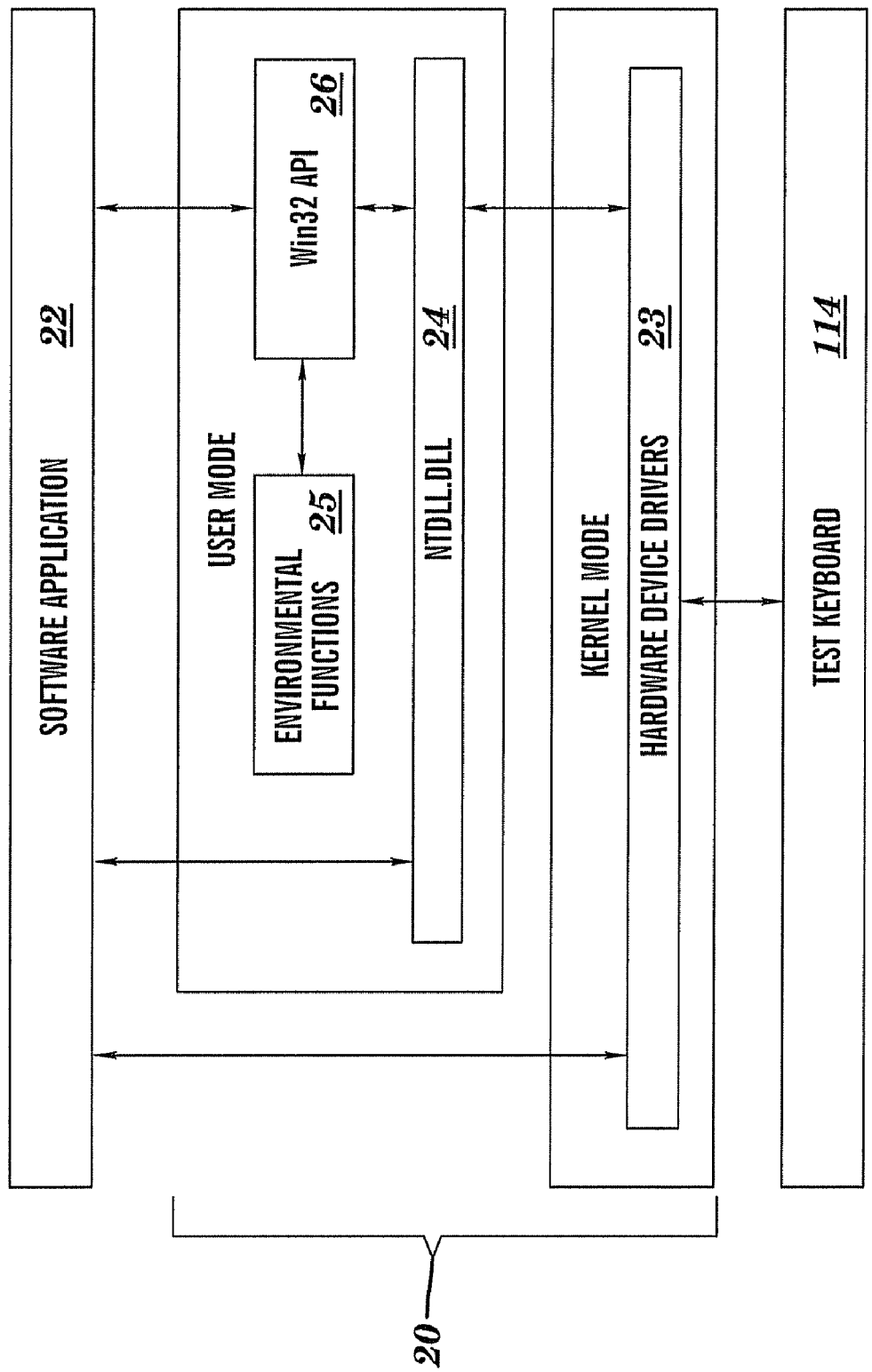
FIG. 2 depicts aspects of an interface between a keyboard and a software application.

FIG. 2 depicts aspects of an operating system architecture 20. The operating system architecture 20 provides an interface between the test keyboard 114 and the software application 22. In this example, the operating system architecture 20 is provided by a Windows NT operating system. The teachings also apply to architectures of other operating systems. In general, the operating system architecture 20 includes hardware device drivers 23. The hardware device drivers execute in the kernel mode. The operating system architecture 20 also includes a NTDLL.DLL 24, environment functions 25, and a Win32 API 26. The NTDLL.DLL 24, the environment functions 25, and the Win32 API 26 operate in the user mode.

The hardware device drivers 23 receive the key signal from the test keyboard 114 associated with the keystroke. The hardware device drivers 23 process the key signal for use by at least one of the software application 22 and the NTDLL.DLL 24. The processed signal used by the NTDLL.DLL 24 undergoes more processing in the user mode before it is sent to the software application 22.

If the processed signal is used by the NTDLL.DLL 24, the NTDLL.DLL 24 provides output for use by the Win32 API 26. The Win32 API 26 also receives input from the environmental functions 25. The environmental functions 25 include definitions of keys, such as sticky keys, set by the user. The Win32 API 26 provides an output to the software application 22 based upon the inputs from the NTDLL.DLL 24 and the environmental functions 25. The output is related to the keystroke from the test keyboard 114. Typically, the keyboard accessibility testing software 121 uses the operating system architecture 20 to poll at least one of the software application 22, the hardware device drivers 23, the NTDLL.DLL 24, the environment functions 25, and the Win32 API 26 to gather information related to the keys associated with the test keyboard 114.

Another technique for identifying the keys provides for creating a library of information for the test keyboards 114. The library includes the key signals for the keys associated with the test keyboards 114. For situations where the library does not include the information for a particular test keyboard 114, the teachings provide for receiving the information, for example via the network 122. With the library of information, the keyboard accessibility testing software 121 identifies the keys associated with the test keyboards 114.

On a simplistic level, one illustrative example is presented to demonstrate the teachings herein. Table 1 presents an input device, an input-stream 1, and an application response. The operator creates an input-stream 1 using the operator keyboard 109 and mouse 110. The keyboard accessibility testing software 121 records the input-stream 1. The recording generates a first test script. It is presumed that the first test script successfully tested the functions of the software application 22. Table 1 provides an embodiment of a basis for the first test script.

TABLE 1

| Input Device | Input-Stream 1 | Software Application 22 Response |
|---|---|---|
| 3 Button Mouse 110 | Left mouse click on Menu A | Brings up Menu A options |
| 3 Button Mouse 110 | Left mouse click on Option B | Brings up Text Box |
| Keyboard 109 | Enters "ABC<CR>" | Data displayed in Text Box |
| 3 Button Mouse 110 | Left mouse click on Button C | Closes Text Box |

The operator may decide to test the functions of the software application 22 using only keystrokes from the operator keyboard 109. The keyboard accessibility testing software 121 identifies all the key signals of the keys associated with the operator keyboard 109. The keyboard accessibility testing software 121 associates the key signals with the input-stream 1. The associating generates a second test script. Table 2 presents an input-stream 2. The input-stream 2 results from the second test script. Referring to Table 2, running the second test script demonstrates that the simulated keystrokes from the operator keyboard 109 results in the same software application 22 responses as running the first test script.

TABLE 2

| Input Device | Input-Stream 2 | Software Application 22 Response |
|---|---|---|
| Keyboard 109 | Alt-A | Brings up Menu A options |
| Keyboard 109 | Ctrl-B | Brings up Text Box |
| Keyboard 109 | Enters "ABC<CR>" | Data displayed in Text Box |
| Keyboard 109 | Ctrl-C | Closes Text Box |

The keyboard accessibility testing software 121 may be used to test the software application 22 for accessibility with the test keyboard 114. The keyboard accessibility testing software 121 identifies the key signals of the keys associated with the test keyboard 114. The keyboard accessibility testing software 121 associates the key signals of the keys of the test keyboard 114 with the input-stream 2. The associating generates a third test script. Table 3 presents an input-stream 3. The input-stream 3 results from the third test script. Referring to Table 3, running the third test script demonstrates that the simulated keystrokes from the test keyboard 114 results in the same software application 22 responses as running the first test script.

TABLE 3

| Input Device | Input-Stream 3 | Software Application 22 Response |
|---|---|---|
| Keyboard 114 | Alt A | Brings up Menu A options |
| Keyboard 114 | Ctrl B | Brings up Text Box |
| Keyboard 114 | Enters "Shift A Shift B Shift C<CR>" | Data displayed in Text Box |
| Keyboard 114 | Ctrl C | Closes Text Box |

Situations may arise where keys from the test keyboard 114 may not map to a successful input-stream. The teachings call for several ways to resolve these situations. One way is for the user to manually modify the test script resulting from the test keyboard 114. For example, the user may manually create at least one of function keys and sticky keys to successfully test the functions of the software application 22. The manually created keys are included in a modified test script. Alternatively, the keyboard accessibility testing software 121 may automatically modify the test script. For example, the keyboard accessibility testing software 121 may automatically create at least one of the function keys and the sticky keys to successfully test the functions of the software application 22.

Figure 3:
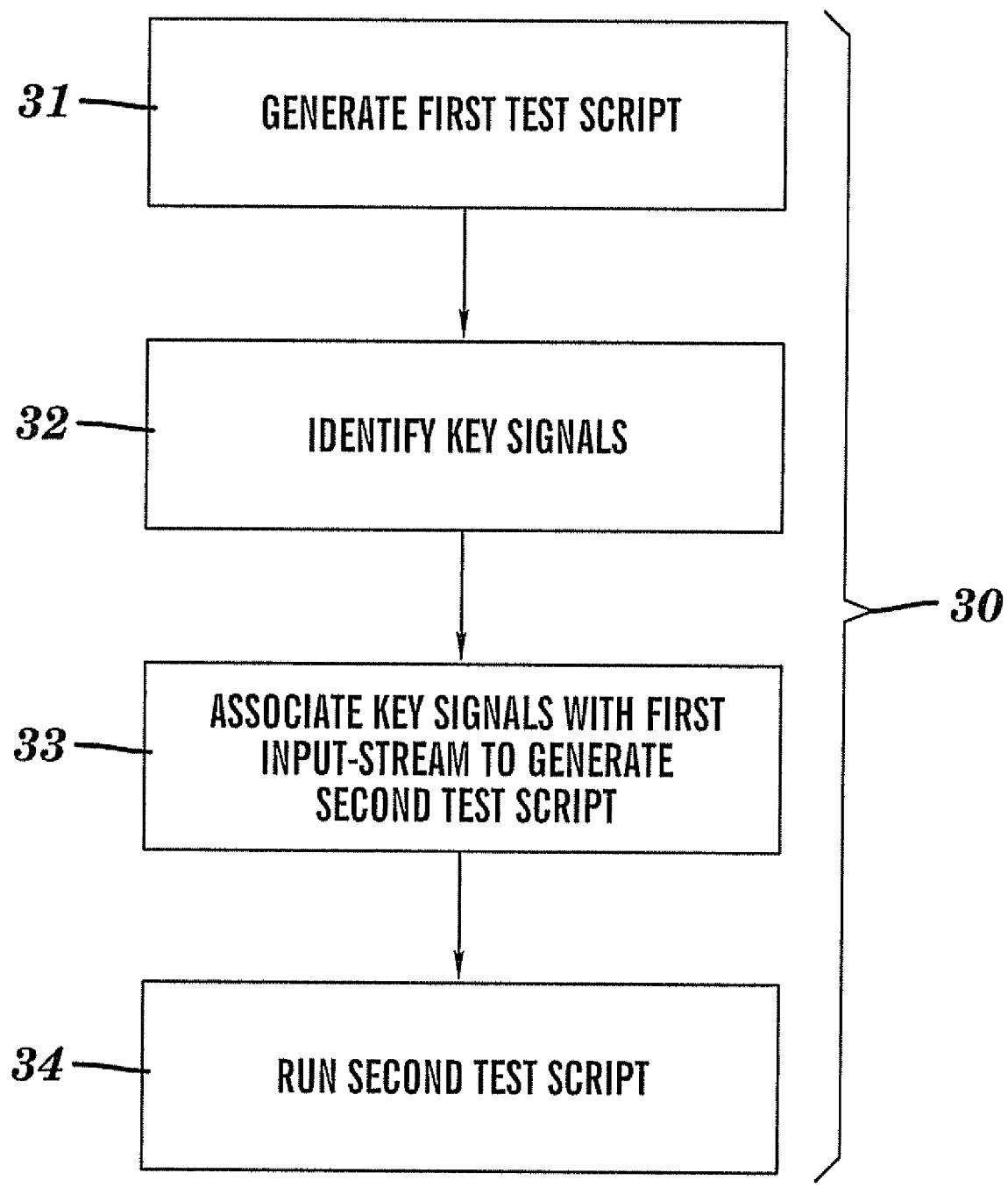
FIG. 3 illustrates an exemplary method for automating certain aspects of testing software for keyboard accessibility.

FIG. 3 presents an exemplary method for automating certain aspects of testing the software application 22 for keyboard accessibility. A first step 31 calls for generating the first test script. The first test script results from a first input-stream. The first input-stream successfully tests the functions of the software application 22. A second step 32 calls for identifying the key signals of the keys associated with the test keyboard 114. A third step 33 calls for associating the key signals to the first input-stream. The associating generates a second test script. A fourth step 34 calls for running the second test script. The fourth step 34 typically includes comparing the results from running the second test script with the results from running the first test script. The fourth step 34 may include generating the function keys and the sticky keys necessary to successfully test the test keyboard 114.

In one embodiment, the test keyboards 114 do not have to be coupled to the computer processing system 100. The keyboard accessibility testing software 121 generates the second test script based upon the library of information for the test keyboards 114.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product stored on machine readable media comprising machine readable instructions for testing software applications for keyboard accessibility, the instructions comprising instructions for:

receiving user input from at least one of a keystroke and a mouse click as a first input stream;

sending an indication to verify a correct response related to the user input;

generating a first test script from the first input stream;

playing back the first test script to simulate the user input, wherein a time for playing back the first test script is less than a time for entering the user input;

identifying key signals associated with keys of a test keyboard;

associating the key signals to the first input-stream to generate a second test script;

running the second test script to test the keyboard accessibility; and in response to an unsuccessful mapping between the first and second test scripts and the user input, modifying the first and second test scripts to successfully map the first and second test scripts to the user input.

2. The computer program product as in claim 1, further comprising instructions for identifying the key signals via an operating system architecture.

3. The computer program product as in claim 1, further comprising instructions for receiving information for the key signals.

4. The computer program product as in claim 1, further comprising instructions for creating a library of information for the key signals.

5. The computer program product as in claim 4, further comprising instructions for identifying the key signals via the library.

6. The computer program product as in claim 1, further comprising instructions for receiving user input to modify the second test script.

7. The computer program product as in claim 1, further comprising instructions for receiving user input generating at least one of function keys and sticky keys.

8. The computer program product as in claim 1, further comprising instructions for automatically modifying the second test script.

9. The computer program product as in claim 1, further comprising instructions for automatically generating at least one of function keys and sticky keys.

10. The computer program product as in claim 1, further comprising instructions for comparing results from running the second test script to the results from running the first test script.

11. The computer program product as in claim 1, wherein the product is an add-in.

12. A computer system comprising a computer program product having instructions for testing software applications for keyboard accessibility, the product comprising instructions for:

receiving user input from at least one of a keystroke and a mouse click as a first input stream;

sending an indication to verify a correct response related to the user input;

generating an initial test script from the first input stream;
playing back the first test script to simulate the user input, wherein a time for playing back the first test script is less than a time for entering the user input;
identifying key signals associated with the keys of a test keyboard via an operating system architecture;
receiving information for the key signals;
creating a library of information for the key signals;
associating the key signals to the first input stream to generate a second test script;
receiving user input to modify the second test script;
receiving user input generating at least one of function keys and sticky keys;
automatically modifying the second test script;
automatically generating at least one of function keys and sticky keys;
running the second test script;
comparing results from running the second test script to the results from running the first test script to test the keyboard accessibility; and
in response to an unsuccessful mapping between the first and second test scripts and the user input, modifying the first and second test scripts to successfully map the first and second test scripts to the user input.

* * * * *